United States Patent [19]

Ervine

[11] 4,007,854
[45] Feb. 15, 1977

[54] APPARATUS FOR FEEDING ARTICLES IN SERIAL ORDER

[75] Inventor: Albert W. G. Ervine, Bridgeport, Conn.

[73] Assignee: Remington Arms Company, Inc., Bridgeport, Conn.

[22] Filed: Oct. 8, 1975

[21] Appl. No.: 620,706

[52] U.S. Cl. .............................. 221/167; 198/392; 221/253

[51] Int. Cl.² .......................................... B65H 9/00

[58] Field of Search .......................... 221/159–162, 221/167–170, 253, 173, 182, 203, 277, 237; 198/287, 267, 268, 276

[56] References Cited

UNITED STATES PATENTS

| | | | |
|---|---|---|---|
| 2,803,377 | 8/1957 | Wilson | 221/160 |
| 3,702,663 | 11/1972 | Joele | 221/167 |
| R21,188 | 8/1939 | La Bounty | 198/251 |

Primary Examiner—Robert B. Reeves
Assistant Examiner—H. Grant Skaggs
Attorney, Agent, or Firm—John H. Lewis, Jr.; Nicholas Skovran; William L. Ericson

[57] ABSTRACT

An apparatus for feeding articles in serial order includes a disc and a surrounding rim, whose axes are tilted with respect to one another, and which are rotated concentrically in a common direction. The disc, and preferably also the rim, have upper working surfaces which are non-planar upwardly-convex surfaces of revolution, e.g. segments of cones having upwardly-directed apices. The disc is spaced below the rim to form a reservoir for a bulk supply of articles to be fed, except at one peripheral location where the disc reaches the elevation of the rim, constituting a transfer station. The inclination of the disc surface decreases from the reservoir to the transfer station. Articles placed on the disc are distributed by gravitational action against the inside of the rim, and elevated by the rotation of the disc to the transfer station, where they roll or slide by centrifugal force onto the rim. A stationary rail encircles the rim to retain an aligned row of articles for delivery by rotation of the rim to a discharge station spaced from the transfer station.

7 Claims, 7 Drawing Figures

APPARATUS FOR FEEDING ARTICLES IN SERIAL ORDER

BACKGROUND AND BRIEF DESCRIPTION OF THE INVENTION

Centrifugal feeders are known which have a disc and rim concentrically rotatable about intersecting, relatively-inclined axes to distribute articles from the disc to the rim, and thence to a discharge station. So far as I am aware, however, known feeders of this type employ a planar inclined disc, which requires sufficient centrifugal force to overcome gravitational action for delivering the articles outwardly onto the rim, and therefore must rotate at a considerable rate of speed. But the centrifugal and gravitational forces act in the same outward direction at the lower edge of the disc, that is, in the article supply reservoir, and the articles are thrown with some violence against the inside of the rim at this point, and subjected to impact shock. Feeders of this nature are suitable for counting coins or feeding other rugged articles, but are objectionable for handling of articles that are delicate or subject to damage by impact or abrasion.

The general object of this invention is to improve the feeding of articles in serial order from a bulk supply; and more specifically, to feed and align articles with reduced abrasion and impact damage. It is another object to increase the range of permissible feed rates of a serial feeding apparatus.

It is a further object to provide a serial feeding apparatus of improved anti-jamming character.

I mount a disc and an encircling rim in relatively inclined positions, so that the disc attains substantially the same height as the rim at one location around its periphery, constituting an article transfer station, but is elsewhere at a lower elevation, forming a reservoir for articles to be fed. The rim and the disc are rotated in a common angular direction, each about its own major axis of revolution; the axis of the disc is inclined at an angle to the vertical, while that of the rim is preferably substantially vertical. These axes intersect at a point near the upper surface of the disc, so that the parts rotate substantially concentrically, although not coaxially. As thus far generally stated, the apparatus conforms to the prior art.

The upper working surface of the disc, and preferably also that of the rim, is a non-planar surface of revolution, such as a segment of a cone, spheroid, paraboloid, or the like. These working surfaces have their apices directed upwardly, i.e. are upwardly-convex, and are symmetrical about their axes of revolution. The inclination of the axis of the conical or curved disc results in a variation in the inclination or slope of its upper working surface from a minimum at the transfer station, to a maximum at a diametrically-opposite point within the parts reservoir defined between the disc and rim. Consequently this surface may be sufficiently steep as it leaves the reservoir to distribute the articles outwardly against the rim chiefly by gravity, requiring little or no assistance by centrifugal force; but at the same time, the disc surface may become level (or slightly tilted inwardly or outwardly) at the transfer station, to allow a modest centrifugal force to roll or slide the articles out onto the rim without substantial opposition by gravity.

In this connection, it should be borne in mind that gravitational and centrifugal forces aid one another to distribute the articles out against the rim in the reservoir, but oppose one another when the disc surface is also inclined upwardly at the discharge station. Planar tilted discs, having a uniform inclination all around their peripheries, must have a relatively high speed of rotation in order to carry the articles up the incline and discharge them to the rim against the resistance of gravity; but the addition of gravity to the resultingly-large centrifugal force in the reservoir bumps the articles violently against one another and against the rim at that point. A non-planar upwardly-convex form permits the disc to be rotated relatively slowly and thereby to reduce impact and abrasion damage to the articles being fed.

My use of a non-planar upwardly-convex rim also allows the speed of its rotation to be relatively low, since the articles are distributed by gravity against a surrounding rail. The articles are thus arranged in serial order on the rim in an aligned single file, and are thence delivered to a circumferentially-spaced discharge station, with reduced shock, abrasion, and impact against one another. Excess or misaligned parts lying on top of the series of aligned parts on the rim may drop or be deflected back into the reservoir during their passage from the transfer station to the discharge station. The parts may if desired be spaced apart along the line of flow, merely by driving the rim at a higher angular velocity than the disc.

DESCRIPTION OF THE DRAWINGS AND THE PREFERRED EMBODIMENTS

While the specification concludes with claims particularly pointing out the subject matter which I regard as my invention, it is believed that a clearer understanding may be gained from the following detailed description of preferred embodiments thereof, referring to the accompanying drawings, in which:

Figure 1:
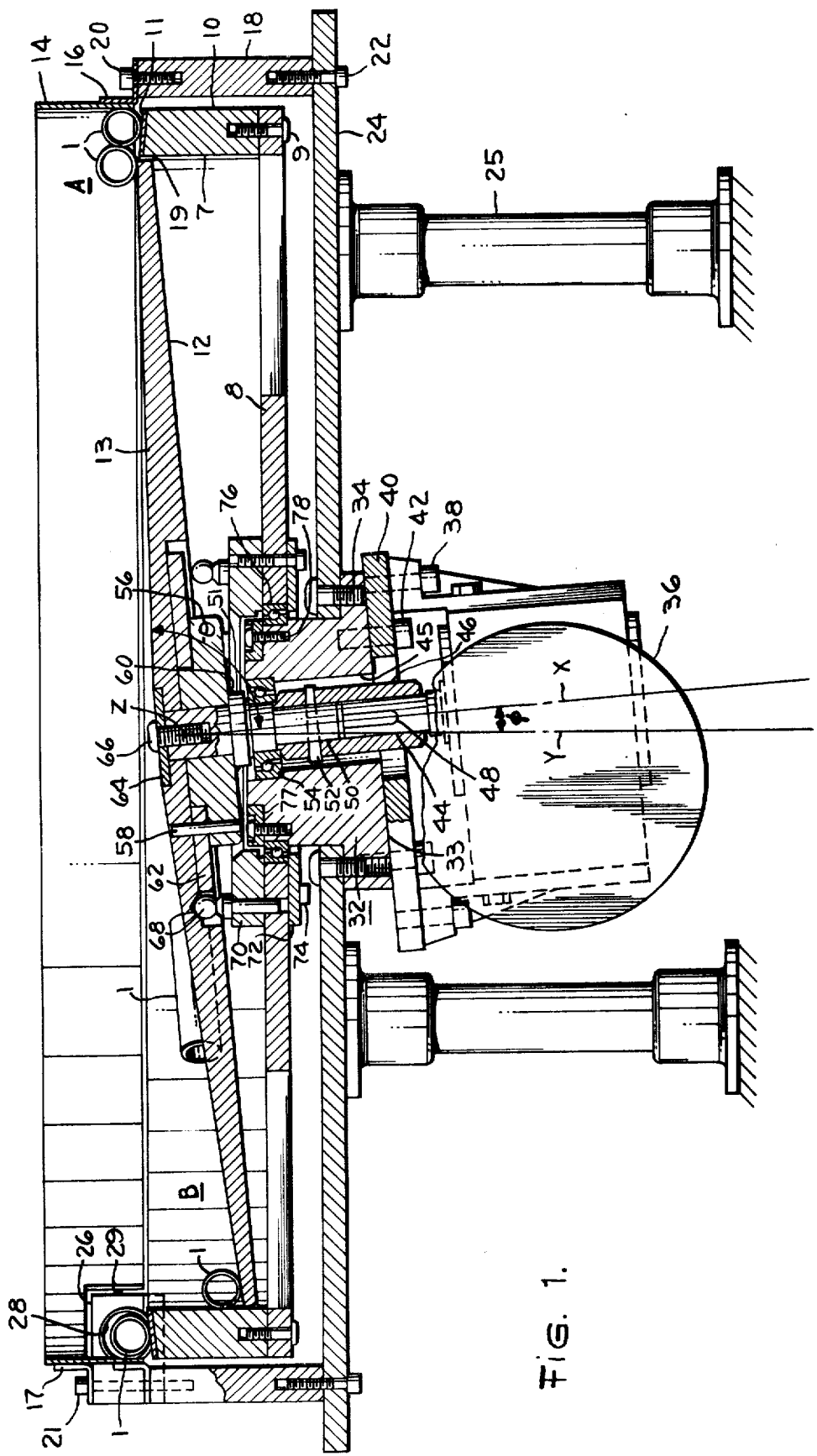
FIG. 1 is a fragmentary, partially sectional view in side elevation of a first form of feeding apparatus according to the invention, in which a disc and a rim are rotated at substantially the same angular velocities.
Figure 2:
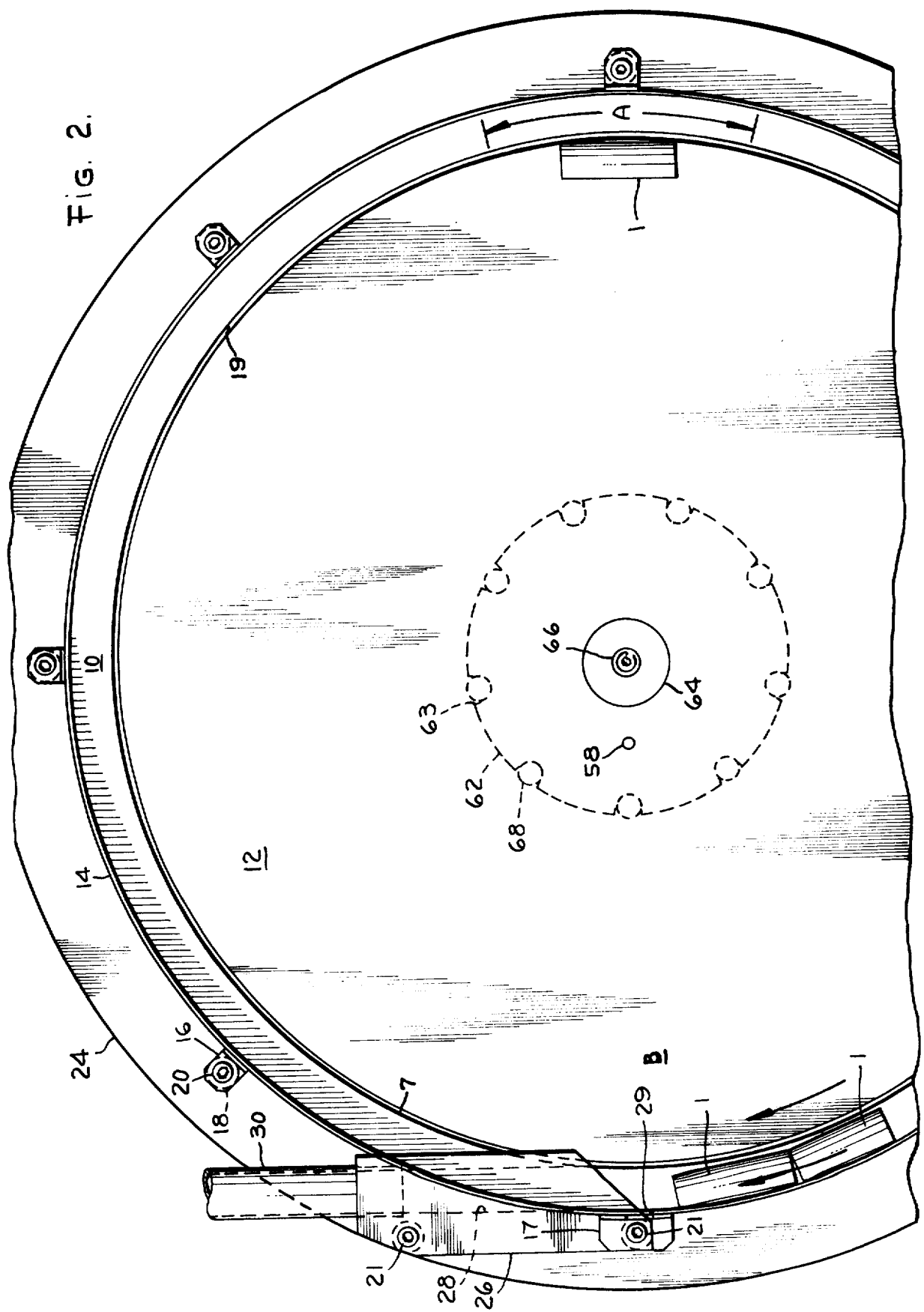
FIG. 2 is a plan view of the apparatus of FIG. 1.

Referring first to FIGS. 1 and 2, I mount a substantially rigid disc 12, having a frusto-conical upper surface 13, for rotational about its axis of revolution or major axis X. The surface 13 is symmetrical about the axis X, and is generated by rotating a straight line segment, intersecting the axis X at an angle $\theta$, about the axis X. The apex of the cone is directed upwardly, and the surface 13 may therefore be described as upwardly-convex. An annular rim 10, also having an upwardly-convex frusto-conical upper surface 11, is circumferentially spaced about the disc 12, and is mounted for rotation about its major axis Y, i.e. the axis of revolution of the surface 11. The surfaces 11 and 13 may alternatively be generated by rotating upwardly-convex curved lines about the axes X and Y.

The axes X and Y extend in directions having vertical components, the latter preferably being vertical as shown, while the former is inclined at an angle $\phi$ to the vertical; and they intersect at a point Z near the surface 13, at a height intermediate the lowest and highest elevations of the periphery of the disc 12, so that the disc and rim rotate substantially concentrically but not coaxially, leaving a small annular gap 19 between them.

The periphery of the disc 12 attains substantially the same elevation as the rim 10 at a transfer station centered in an arcuate region designated at A in FIG. 2, and appearing at the right side of FIG. 1. The remainder of the disc, or at least of its peripheral portion, is spaced below the rim surface 11, and forms a reservoir B in combination with the encircling interior surface 7 of the rim, for receiving a plurality of articles in bulk and in random order. A few illustrative articles 1, of an elongated cylindrical form, are shown at various stages of feeding on the disc and rim. It will be understood however that articles of various forms and sizes may be fed by the improved apparatus.

The disc 12 is secured on a stub shaft 50 by means of a screw 66 and a washer 64, and drivingly connected to this shaft by a pin 58 passing through a drive collar 56 and a sprocket 62, whose function of driving the rim 10 will be further described. The collar 56 is secured as by welding at 60 to a circumferential flange 51 of the shaft 50. A thrust bearing 54 is seated in a shaft-receiving bore 45 of a stationary mounting block 32 to locate the disc 12 and support it for rotation about the axis X. The disc is driven at a desired angular velocity by a conventional gear motor 36, mounted on a suitably-slanted surface 33 of the block 32 by means of a mounting plate 40 having attachment screws 38 and 42. The motor 36 is drivingly connected to the disc 12 by means of a collar 46, secured by a key (not shown) received in a keyway 48 of the drive shaft 44, and by a taper pin 52 passed through the stub shaft 50.

The rim 10 is mounted by screws 9 on an annular support plate 8, having rings 70 and 72 attached to its inner edge by screws 74. The rim is supported for rotation about the axis Y by a thrust bearing 76, whose outer race is engaged between the rings 70 and 72, and whose inner race is secured on the mounting block 32 by a ring 77 and screws 78. A plurality of spherically-headed drive studs 68 are mounted in circumferentially-spaced relation about the ring 70, and are successively engageable with corresponding teeth 63 (see FIG. 2) formed in the inclined sprocket 62. By these means the rim 10 is driven at substantially the same angular velocity as the disc 12, and in the same angular direction.

A stationary rail 14 encircles the rim 10 is supported by standoffs or brackets 16 and 17 attached to circumferentially-spaced stanchions 18 by screws 20 and 21. A base plate 24 mounted on posts 25 supports the rail as well as the disc-and-rim mechanism, being attached to the stanchions 18 by screws 22, and to the block 32 by screws 34.

The rail 14 is interrupted at a discharge station, circumferentially spaced from the transfer station at A, by a cutout 29. A discharge track 26 extends through the rail and over the rim at this station, and is formed with a passage 28 for removing a line of parts 1 in a tangential direction from the rim for delivery through a tube 30 for use in further processing.

The operation of the apparatus and its novel made of feeding will now be readily understood. Parts 1 are loaded in bulk and with random orientation into the reservoir B, and are carried by the rotation of the disc toward the transfer station A, while at the same time they are distributed outwardly against the interior wall 7. If the articles are elongated as shown, this action also orients their longitudinal axes to extend tangentially to the disc 12. Distribution against the rim is induced primarily by gravity, since the disc has its maximum downward slope in the area of the reservoir, and this is aided by whatever centrifugal force is generated at the selected speed of rotation. The outward slope of the disc, assisted by centrifugal force, holds the articles in frictional engagement against the rim and the disc to prevent backsliding as the parts are elevated by rotation toward the discharge station. The surfaces of the disc or rim may have coatings of friction material if needed to prevent skidding of low-friction articles.

As the articles reach the transfer station at A, they are urged by centrifugal force to roll or slide radially outwardly; in the illustrated form, this force is opposed only by a very small inwardly-directed gravitational force component, in view of the nearly horizontal slope of the conical disc at this position. It will be evident that by appropriate selection of the cone angle of the disc and its angle of inclination, the surface 13 may alternatively be made horizontal, or may even decline outwardly at this position, so that gravitational force may be neutralized or brought into aiding relation to centrifugal force if desired. Therefore, only sufficient rotational speed of the disc is required to provide the desired feed rate. The outward slope of the surface 11 is adequate to hold the articles against the rail 14 without aid. The speeds of the disc 12 and rim 10 may in consequence be dictated solely by balancing considerations of the desired feed rate against any propensity of the particular articles to become damaged by abrasion or impact, rather than by any need to establish sufficient centrifugal force to feed them onto the rim against gravity.

The articles 1 are thus caused to roll or slide, as gently as may be necessary, outwardly onto the rim surface 11 at the transfer station A, from whence they are carried by the rotation of the rim 10 to be delivered in end-to-end alignment serially through the discharge track 26.

In the form shown, the surface 11 and the rail 14 are dimensioned so that the parts may transfer from the disc to the rim only in single file, and additional parts remain on the disc until space for them develops on the rim, as will be apparent from the illustration of two abutting parts at the right side of FIG. 1. However, the rim and rail could if desired be dimensioned and spaced to permit two or more parallel lines of parts to form on the rim, with the substitution of a suitable multiple discharge track for the single track 26.

Figure 3:
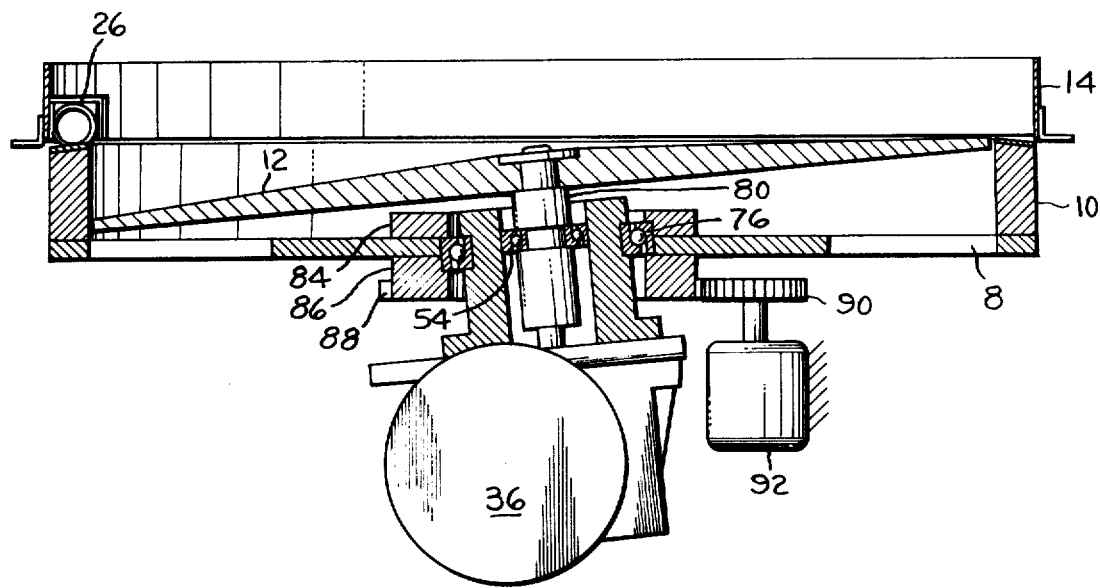
FIG. 3 is a fragmentary, partially sectional view in side elevation of a modified feeding apparatus in which a disc and a rim may be rotated at different angular velocities.

In the embodiment of FIGS. 1 and 2, the disc 12 and rim 10 are driven at substantially the same angular velocity, which has the effect of delivering a line of parts in end-to-end abutment, and the advantage that the parts are not subjected to angular acceleration during their transfer from the disc to the rim. It may however be desired in some applications to space the parts along the line of delivery, and a construction of this nature is shown in FIG. 3, in which elements similar to those of FIGS. 1 and 2 are similarly numbered. Here, the gear motor 36 drives only the disc 12, through a stub shaft 80. The assembly of the rim 10 and the plate 8 is driven by an output pinion 90 of a separate motor 92, whose speed is independently controllable by any conventional means (not shown), and which is drivingly connected with this assembly through a gear 88 and rings 84 and 86 attached to the plate 8. By these means the rims 10 may be driven at a higher angular velocity than the disc 12, which causes the line of parts 10 to become circumferentially spaced apart about the rim. In some circumstances it may on the other hand be appropriate to drive the rim at a slower speed than the disc, as for example where the supply of parts to the disc is intermittent or delayed, but it is nevertheless desired to ensure the delivery of a continuous line of abutting parts from the rim; this can also be achieved by controlling the motors 36 and 92 to produce an appropriate speed ratio.

In the illustrated constructions the angle between the axes X and Y of the disc and rim is fixed, but this angle may be made adjustable by the use of well-known expedients which are not illustrated, such as the provision of a universal joint in the disc drive connection, and the use of a movable bearing support for the disc. This would permit adjustment in the depth of the reservoir B. It will be evident that it is permissible for the periphery of the disc 12 to reach a higher elevation than the rim 10 at the transfer station A, rather than the substantially equal height shown, since the parts will nonetheless be transferred freely. If it is desired to ensure that the parts do not rest atop one another on the rim, a projection (not shown) can be attached on the inner surface of the rail 14 at a height just above a single line of parts resting directly on the rim, to knock excess parts back into the reservoir, in accordance with a conventional practice.

It will be understood that the upper working surfaces 13 and 11 of the disc and rim may, within the scope of the invention, alternatively assume the form of any of a variety of non-planar upwardly-convex surfaces of revolution which are symmetrical about the axis of revolution, such as segments of spheroids, paraboloids, or the like, generated by rotating a selected upwardly-convex curved line about the corresponding axis of revolution X or Y.

FIGS. 4-7 illustrate modified flexible rim structures which, when used with articles of certain forms, provide a means for returning those articles that may assume an incorrect orientation on the rim back to the reservoir. These arrangements are also adapted to position articles of certain forms into desired uniform orientations on the rim, prior to delivery at the discharge station.

Figure 4:
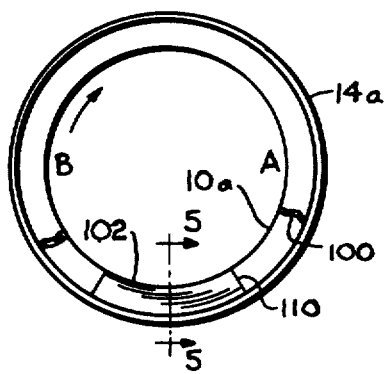
FIG. 4 is a fragmentary plan view of a modification having a flexible rim arrangement for returning misoriented articles to a reservoir.
Figure 5:
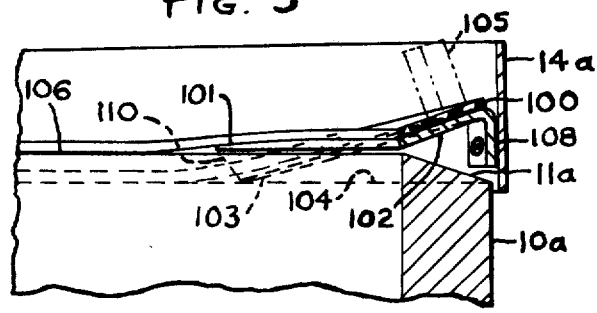
FIG. 5 is a fragmentary sectional view taken along line 5—5 in FIG. 4, looking in the direction of the arrows.

In FIGS. 4 and 5, parts similar to those of FIGS. 1-3 are similarly numbered, with subscripts a. The disc and discharge track are not illustrated in these figures for the sake of greater clarity. A flexible annular belt 100, conformable to the upper frusto-conical surface 11a of the rim, rests in frictional engagement on this surface over the major part of its circumferential length, and rotates with the rim in the direction shown by the arrow in FIG. 4. However, in an arc located between the transfer station A and the discharge station B, the belt 100 is lifted from the surface 11a and given a reverse twist by deflecting means comprising an arcuate shoe 102, and then restored to rest on the rim. The shoe 102 is secured by one or more tabs 108 fastened to the rim 14a, and may be fashioned from sheet metal or plastic, by any suitable process such as bending, machining, or casting. This shoe presents a warped upper surface whose inner circumferential edge 101 rises only slightly from the inner edge 106 of the surface 11a, but whose outer edge 103 rises from the outer, lower edge 104 of the surface 11a to a height greater than that of the edge 106. Thus the upper surface of the shoe, first engaging the belt 100 at a leading edge 110 which conforms to the outward incline of the rim, twists the belt into a reversed inward slope at the plane of FIG. 5. The remainder of the shoe 102 is a mirror image of the portion shown in FIG. 5, and returns the belt to rest on the surface 11a with its previous outward slope before it reaches the discharge station B.

An article of non-cylindrical shape is illustrated at 105, having for example the form of a rectangular solid. If this article reaches the shoe 102 in the upright position shown, the slope of the shoe being appropriate to its specific form, it will topple off the belt 100 and fall back into the reservoir within the rim 10a; if it arrives resting on its side, it will remain on the belt. Thus all the articles arriving at the discharge station will be uniformly oriented on their sides, while the outward slope of the rim will also cause them to be oriented in end-to-end relation. Alternatively, the shoe 102 may exhibit a rise in the circumferential direction, but maintain an outward slope throughout (this form is not illustrated), and would then serve to topple any upright articles backward to rest on their sides on the belt, without returning them to the reservoir.

Figure 6:
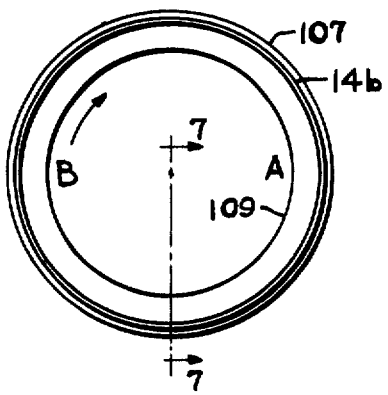
FIG. 6 is a fragmentary plan view of another modification having a flexible rim arrangement.
Figure 7:
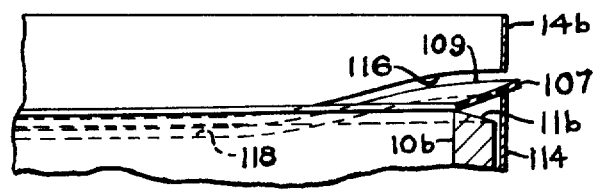
FIG. 7 is a fragmentary sectional view taken along line 6—6 in FIG. 6, looking in the direction of the arrows.

In the modification shown in FIGS. 6 and 7, in which parts similar to those of the foregoing embodiments are similarly numbered with subscripts b, a flexible annular belt 109 has a diameter at its outside edge 107 that is slightly greater than that of the rail 14b. The outer edge of the belt rests on deflecting means which comprise an upper edge or track 118 of an annular cylindrical supplementary rail member 114. The edge 118 is vertically spaced from a lower edge 116 of the rail 14b with sufficient clearance to allow the belt to turn freely with the rim 10b while sliding around the edge 118, but without enough of a gap to allow the articles being fed to escape outwardly off the belt. The rail 14b and supplementary rail 114 are stationary, being mounted by suitable stanchions (not shown). The edges 116 and 118 remain at a uniform height around most of their circumferences, but are vertically curved in parallelism about an arc situated between the transfer station A and the discharge station B. This curve first rises as shown in FIG. 7 to a height above the surface 11b, then falls back to its original level in a reverse curve which is a mirror image of that in FIG. 7. The rotating belt 109 is thus twisted into an inward slope at the plane of FIG. 7, then restored to its former outward slope, the mode of operation being substantially the same as in the embodiment of FIGS. 4 and 5.

What I claim is:

1. Apparatus for feeding articles in serial order, comprising in combination:
    a disc having an upper working surface which is a non-planar upwardly-convex surface of revolution symmetrical about an axis of revolution thereof;
    a rim extending circumferentially about said disc and having an upper working surface which is a surface of revolution symmetrical about an axis of revolution thereof;

means supporting said disc and said rim for rotation each about its own axis of revolution, with the axis of revolution of said rim extending substantially vertically and the axis of revolution of said disc being inclined to the vertical;

the periphery of said working surface of said disc extending to at least substantially the same elevation as an adjacent region of said working surface of said rim at one fixed peripheral location constituting an article transfer station, and extending to a substantially lower elevation than an adjacent region of said working surface of said rim at another fixed peripheral location to define a reservoir for articles within said rim, said working surface of said disc being inclined at a greater slope in said reservoir than at said transfer station;

said disc and rim being constructed and arranged, upon rotation thereof, to distribute articles from said reservoir outwardly against said rim, to elevate the distributed articles from said reservoir and deliver them serially onto said rim at said transfer station, and thence to convey a series of said articles away from said transfer station on said working surface of said rim;

and rail means extending circumferentially about said rim and being interrupted at an article discharge station spaced circumferentially about said rim from said transfer station in the region of said reservoir, said rail means being spaced outwardly from said rim to retain an aligned series of articles on said rim and to permit free conveyance of said aligned series by said rim from said transfer station to said discharge station while permitting excess and misaligned articles to be returned from said rim to said reservoir prior to arrival at said discharge station.

2. Apparatus as recited in claim 1, said upper working surface of said rim having the form of a non-planar upwardly-convex surface of revolution symmetrical about said axis of rotation of said rim;

together with an annular flexible belt conformable to said rim surface and supported thereon for rotation therewith, and means for deflecting at least a portion of said belt from said rim surface and then returning said belt into conformity with said rim surface about an arcuate region of said rim circumferentially located between said transfer station and said discharge station, said elevating means being constructed and arranged for causing said belt to deliver articles to said discharge station with a consistent orientation.

3. Apparatus as recited in claim 2, said deflecting means being constructed and arranged to twist said belt to incline inwardly of said rim within said arcuate region.

4. Apparatus as recited in claim 2, said deflecting means comprising a stationary shoe extending about said arcuate region of said rim and interposed between said belt and said rim, said shoe being formed with an inclined upper surface slidably engaging and deflecting said belt in said arcuate region.

5. Apparatus as recited in claim 2, said rail means including a vertically-curved track comprising said deflecting means, said belt engaging said track at least in said arcuate region of said rim.

6. Apparatus as recited in claim 1, said upper working surfaces of said disc and said rim having the forms of segments of cones with upwardly-directed apices.

7. Apparatus as recited in claim 1, said upper working surface of said rim having the form of a non-planar upwardly-convex surface of revolution.

* * * * *